US009995098B2

(12) United States Patent
Brana et al.

(10) Patent No.: US 9,995,098 B2
(45) Date of Patent: Jun. 12, 2018

(54) CHOKE CONTROL TUNED BY FLOW COEFFICIENT FOR CONTROLLED PRESSURE DRILLING

(71) Applicant: Weatherford Technology Holdings, LLC, Houston, TX (US)

(72) Inventors: Jose D. Brana, Cypress, TX (US); Jeffrey W. Niazy, Liberty, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 231 days.

(21) Appl. No.: 14/876,260

(22) Filed: Oct. 6, 2015

(65) Prior Publication Data

US 2016/0102511 A1 Apr. 14, 2016

Related U.S. Application Data

(60) Provisional application No. 62/061,527, filed on Oct. 8, 2014.

(51) Int. Cl.
*E21B 21/08* (2006.01)
*E21B 34/02* (2006.01)
(Continued)

(52) U.S. Cl.
CPC ............... *E21B 21/08* (2013.01); *E21B 7/00* (2013.01); *G05B 19/042* (2013.01); *G05B 2219/23399* (2013.01)

(58) Field of Classification Search
CPC .......... E21C 33/03; E21C 34/02; E21C 21/10; E21C 21/106; E21C 44/00; E21C 21/08
See application file for complete search history.

(56) References Cited

U.S. PATENT DOCUMENTS 4,556,956 A * 12/1985 Dickenson ............... F01D 17/24
  415/17
7,044,237 B2  5/2006 Leuchtenberg
  (Continued)

FOREIGN PATENT DOCUMENTS

EP  0 540 079 B1  12/1995
GB  2 123 983 A   2/1984
  (Continued)

OTHER PUBLICATIONS

Ferguson Enterprises, "About Cv (Flow Coefficients)," Technical Brochure, copyright 2012, version Mar. 2012.
(Continued)

*Primary Examiner* — Cathleen R Hutchins
(74) *Attorney, Agent, or Firm* — Blank Rome LLP

(57) ABSTRACT

A computerized control is used in controlling a choke when drilling a wellbore with a drilling system. The computerized control obtains a measured value of a parameter in the drilling system and controls the parameter in the drilling system using the choke. The computerized control obtains indications of an error between a set point of the parameter and the measured value of the parameter in the drilling system, a flow coefficient character of the choke, and a current position of the choke. Based on these indications, the computerized control then determines a position adjustment for the choke and adjusting the parameter in the drilling system by applying the position adjustment to the choke.

27 Claims, 6 Drawing Sheets

(51) Int. Cl.
E21B 21/10 (2006.01)
E21B 7/00 (2006.01)
G05B 19/042 (2006.01)

(56) References Cited

U.S. PATENT DOCUMENTS

| | | |
|---|---|---|
| 7,606,636 B2 | 10/2009 | Dykstra |
| 7,636,614 B2 | 12/2009 | Dykstra |
| 7,769,493 B2 | 8/2010 | Elshafei et al. |
| 8,352,087 B2 | 1/2013 | Yli-Koski |
| 2003/0024737 A1 | 2/2003 | Chang et al. |
| 2007/0151762 A1* | 7/2007 | Reitsma .................. E21B 21/08 175/40 |
| 2011/0094607 A1 | 4/2011 | Elliott |
| 2012/0330466 A1* | 12/2012 | Rodger .................. E21B 34/02 700/282 |

FOREIGN PATENT DOCUMENTS

| | | |
|---|---|---|
| WO | 2014/007797 A1 | 1/2014 |
| WO | 2014007797 A1 | 9/2014 |

OTHER PUBLICATIONS

PCT Search Report and Written Opinion mailed in co-pending PCT Application No. PCT/US2015/054452 dated Nov. 2, 2016, 10 pages.
Examination Report No. 1 in counterpart AU Appl. 2015328157, dated Nov. 20, 2017, 4 pgs.
First Office Action in counterpart CA Appl. 2963668, dated Feb. 13, 2018, 6 pgs.

\* cited by examiner

*(Background)*

*(Background)*

*(Background)*

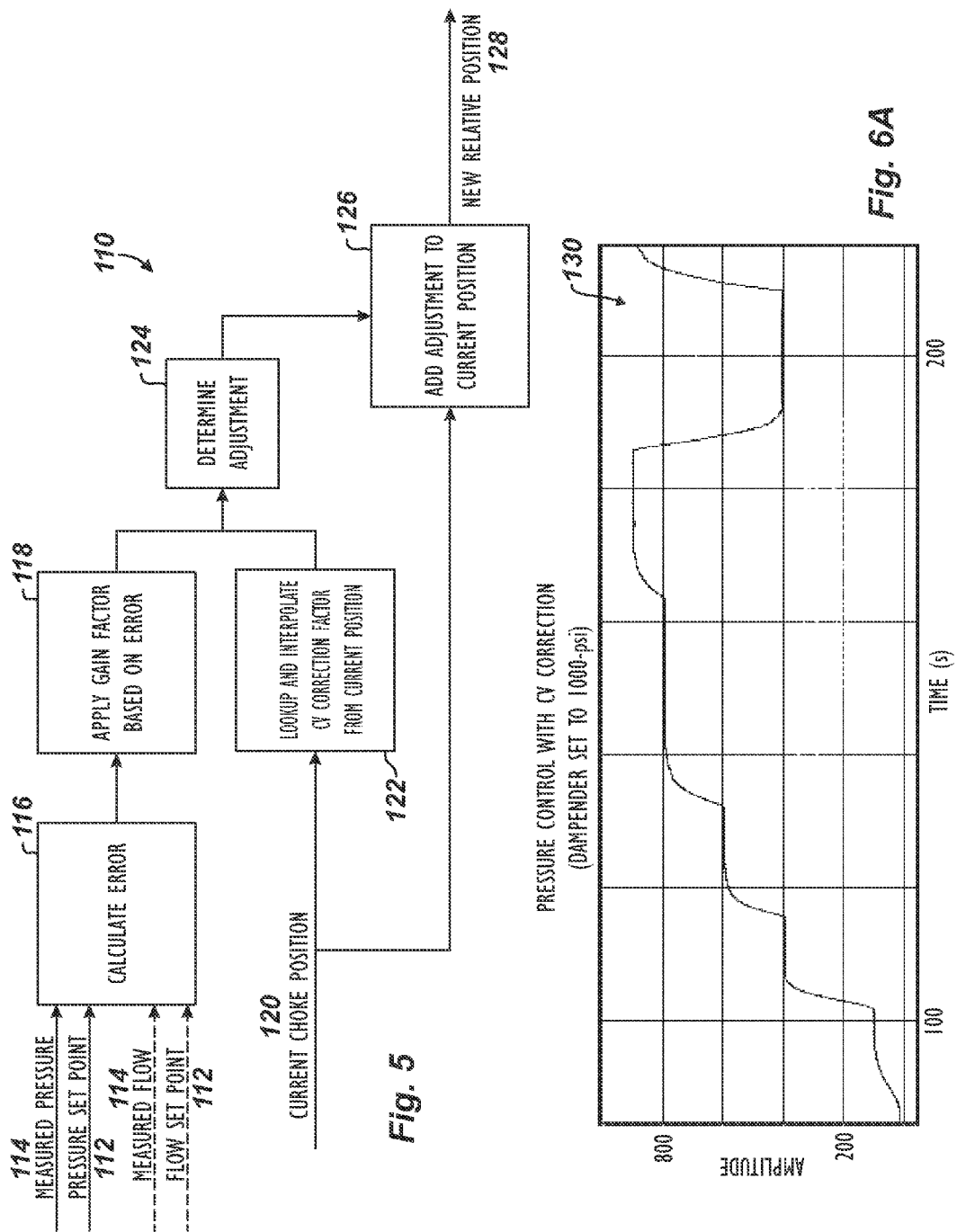

CHOKE CONTROL TUNED BY FLOW COEFFICIENT FOR CONTROLLED PRESSURE DRILLING

CROSS-REFERENCE TO RELATED APPLICATIONS

This application claims the benefit of U.S. Provisional Appl. 62/061,527, filed 8 Oct. 2014, which is incorporated herein by reference.

BACKGROUND OF THE DISCLOSURE

Several controlled pressure drilling techniques are used to drill wellbores with a closed-loop drilling system. In general, controlled pressure drilling includes managed pressure drilling (MPD), underbalanced drilling (UBD), and air drilling (AD) operations.

In the Managed Pressure Drilling (MPD) technique, the drilling system uses a closed and pressurizable mud-return system, a rotating control device (RCD), and a choke manifold to control the wellbore pressure during drilling. The various MPD techniques used in the industry allow operators to drill successfully in conditions where conventional technology simply will not work by allowing operators to manage the pressure in a controlled fashion during drilling.

During drilling, for example, the bit drills through a formation, and pores become exposed and opened. As a result, formation fluids (i.e., gas) can mix with the drilling mud. The drilling system then pumps this gas, drilling mud, and the formation cuttings back to the surface. As the gas rises up the borehole in an open system, the gas expands and hydrostatic pressure decreases, meaning more gas from the formation may be able to enter the wellbore. If the hydrostatic pressure is less than the formation pressure, then even more gas can enter the wellbore.

A core function of managed pressure drilling attempts to control kicks or influxes of fluids as described above. This can be achieved using an automated choke response in a closed and pressurized circulating system made possible by the rotating control device. A control system controls the chokes with an automated response by monitoring flow in and out of the well, and software algorithms in the control system seek to maintain a mass flow balance. If a deviation from mass balance is identified, the control system initiates an automated choke response that changes the well's annular pressure profile and thereby changes the wellbore's equivalent mud weight. This automated capability of the control system allows the system to perform dynamic well control or CBHP techniques.

The chokes of the manifold have a non-linear response. This can make it difficult to determine the true position of the chokes and properly control pressure and flow as conditions change. Techniques are available in the prior art to calculate the true position of the chokes so that a desired flow rate or pressure drop can be produced. To do the calculations, these prior art techniques may use variables, such as flow coefficient, characteristic of the valve, discharge coefficient, etc.

For instance, U.S. Pat. No. 8,352,087 discloses a way to control a flow control valve by determining a corresponding flow coefficient Cv from a curve of the valve using a measured valve opening, calculating a pressure drop from a measured flow and the valve's determined flow coefficient, calculating a flow error between the set point flow and measured flow, calculating a corrected flow value by adding the set point flow to the integrated flow error, calculating a new flow coefficient Cv from the corrected flow and the calculated pressure drop, and finally determining a new valve opening corresponding to the new flow coefficient. From this, the position for the new valve opening to meet the desired flow is used to control the valve so that the technique can attempt to linearize the relationship between control and flow.

U.S. Pat. No. 7,636,614 discloses a non-linear dynamic model for a control valve to account for physical changes to a valve's dead band and flow coefficient due to mechanical wear of the valve during operation. The current dead band and flow coefficient determined for the valve can be used to update valve control algorithms and to make maintenance decisions for the valve.

U.S. Pat. No. 7,769,493 discloses a programmable flow controller that can be programmed with user-selectable flow characteristics, such as a function relating percentage flow rate to percentage valve stem position, which can be stored in firmware of the controller and can be used to calculate a correction factor for a control signal to a control valve positioner.

Although these techniques of controlling chokes may be useful, what is needed is a way to control a choke in a controlled pressure drilling system that better adapts to the flow characteristics and changes encountered in that environment.

The subject matter of the present disclosure is directed to overcoming, or at least reducing the effects of, one or more of the problems set forth above.

SUMMARY OF THE DISCLOSURE

According to the present disclosure, a method of drilling a wellbore with a computerized control uses a drilling system having a choke. The computerized control obtains a measured value of a parameter in the drilling system and controls the parameter in the drilling system using the choke.

For example, the computerized control can receive the measured value from at least one measurement device in the drilling system, such as from a pressure sensor, a flow meter, etc. The control can control any of a number of parameters in the drilling system using the choke, such as controlling a surface back pressure in the wellbore, a flow rate of drilling fluid out of the wellbore, a pressure during a drillpipe connection while drilling with the drilling system, a pressure during a loss detected while drilling with the drilling system, and a flow during a kick detected while drilling with the drilling system.

In the method, the computerized control obtains indications of an error between a set point of the parameter and the measured value of the parameter in the drilling system, a flow coefficient character of the choke, and a current position of the choke. Based on these indications, the computerized control then determines a position adjustment for the choke and adjusting the parameter in the drilling system by applying the position adjustment to the choke.

The indication of the error between the set point and measured value can be obtained by applying a gain to the error. The gain can be determined by a magnitude of the error. For example, the gain can be an error-based factor inversely proportional to the magnitude of the error (e.g., interpolated from a lower limit to an upper limit in relation to an upper magnitude to a lower magnitude of the error).

To obtain the indications of the flow coefficient character of the choke and the current position of the choke, the control can obtain a flow coefficient for the choke at the current position from stored information of the flow coefficient character by interpolating the flow coefficient from the stored information. For instance, the control can store the indication of the flow coefficient character of the choke in relation to various positions of the choke. To determining the position adjustment, the computerized control can interpolate a correction factor based on the stored flow coefficient character of the choke in relation to the current position of the choke and can then apply the correction factor to the error.

In other words, the position adjustment for the choke is determined, for example, by scaling the error by the flow coefficient for the choke at the current position or scaling a value of the error by a proportional gain. Either way, a new relative position for the choke is determined by adding the position adjustment to the indication of the current position of the choke.

According to the present disclosure, the method involves drilling the wellbore with the drilling system by controlling, with the computerized control, the parameter in the drilling system using the choke. A value of the parameter is measured using at least one measurement device in the drilling system, and the computerized control calculates an error value between a set point of the parameter and the measured value of the parameter.

From this, the computerized control interpolates a correction factor based on a flow coefficient character of the choke and a current position of the choke and determines a position adjustment for the choke by applying the correction factor to the error. The computerized control then determines a new relative position for the choke by applying the position adjustment for the choke to the current position of the choke and adjusts the parameter in the drilling system using the choke by applying the new relative position to the choke.

According to the present disclosure, a computerized control of a choke used in a drilling system for drilling a wellbore includes storage and a programmable control device. The storage store a flow coefficient character of the choke in relation to positions of the choke. The programmable control device is operatively coupled to the storage and to the choke. The programmable control device is operable to obtain a measured value of a parameter in the drilling system and to control the parameter in the drilling system using the choke. The control device obtains indications of an error between a set point of the parameter and the measured value of the parameter in the drilling system, the flow coefficient character of the choke, and a current position of the choke. Based on these indications, the control device determines a position adjustment for the choke and applies the position adjustment to the choke to adjust the parameter in the drilling system.

The foregoing summary is not intended to summarize each potential embodiment or every aspect of the present disclosure.

BRIEF DESCRIPTION OF THE DRAWINGS

FIG. 5 illustrates a choke control according to the present disclosure.

FIG. 6A graphs pressure control achieved with the disclosed choke control.

DETAILED DESCRIPTION OF THE DISCLOSURE

A. System Overview

Figure 1:
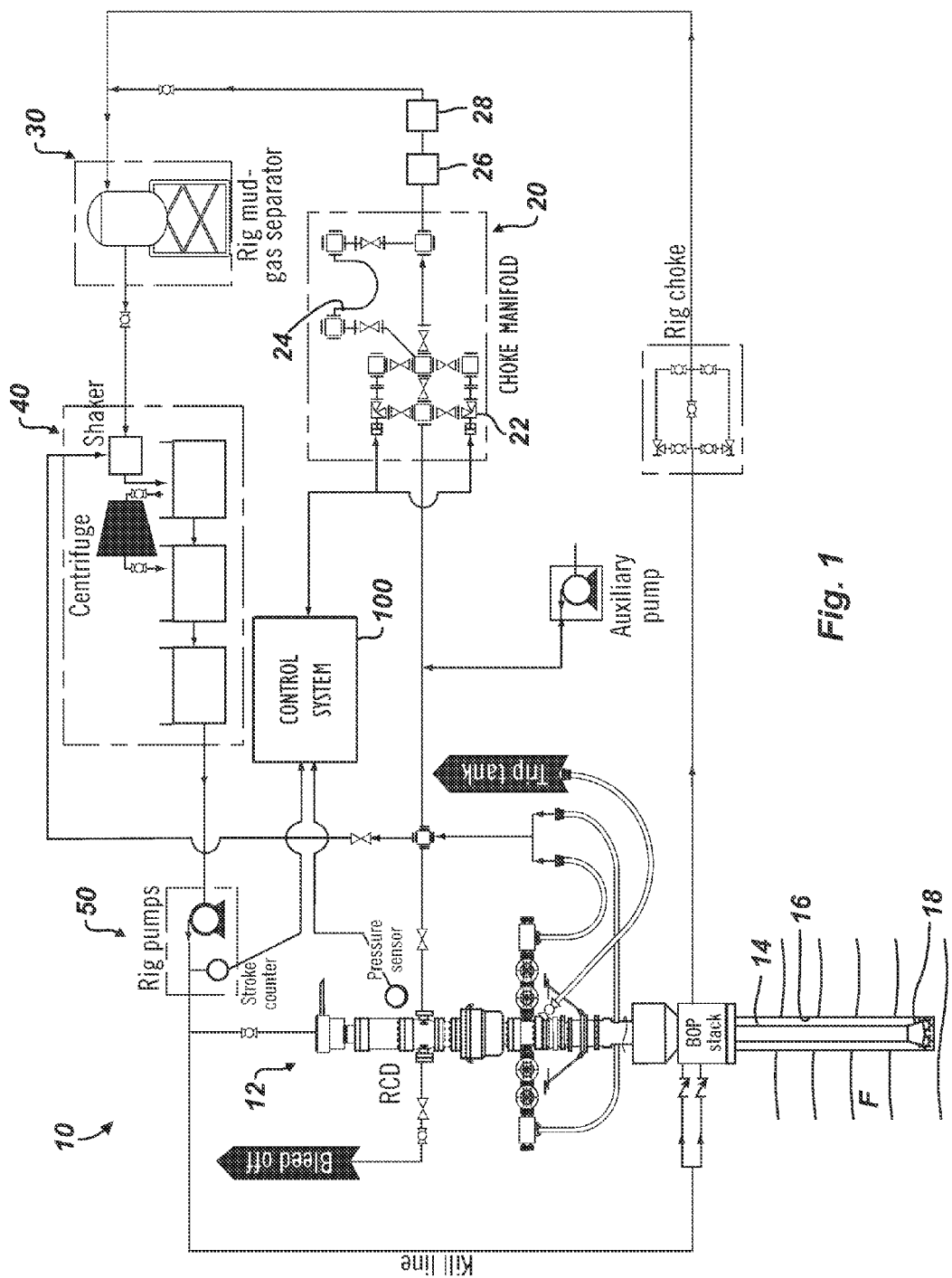
FIG. 1 show a controlled pressure drilling system having a control system according to the present disclosure.

FIG. 1 shows a closed-loop drilling system 10 according to the present disclosure for controlled pressure drilling. As shown and discussed herein, this system 10 can be a Managed Pressure Drilling (MPD) system and, more particularly, a Constant Bottomhole Pressure (CBHP) form of MPD system. Although discussed in this context, the teachings of the present disclosure can apply equally to other types of controlled pressure drilling systems, such as other MPD systems (Pressurized Mud-Cap Drilling, Returns-Flow-Control Drilling, Dual Gradient Drilling, etc.) as well as to Underbalanced Drilling (UBD) systems, as will be appreciated by one skilled in the art having the benefit of the present disclosure.

The drilling system 10 has a rotating control device (RCD) 12 from which a drill string 14, a bottom hole assembly (BHA), and a drill bit 18 extend downhole in a wellbore 16 through a formation F. The rotating control device 12 can include any suitable pressure containment device that keeps the wellbore in a closed-loop at all times while the wellbore 16 is being drilled. The rotating control device (RCD) 12 atop the BOP contains and diverts annular drilling returns. It also completes the circulating system to create the closed loop of incompressible drilling fluid.

The system 10 also includes mud pumps 50, a standpipe (not shown), a mud tank 40, a mud gas separator 30, and various flow lines, as well as other conventional components. In addition to these, the drilling system 10 includes an automated choke manifold 20 that is incorporated into the other components of the system 10.

Finally, a control system 100 of the drilling system 10 is a computerized control that integrates hardware, software, and applications across the drilling system 10. The control system 100 is used for monitoring, measuring, and controlling parameters in the drilling system 10. In this contained environment of the closed-loop drilling system 10, minute wellbore influxes or losses are detectable at the surface, and the control system 100 can further analyze pressure and flow data to detect kicks, losses, and other events.

The automated choke manifold 20 manages pressure and flow during drilling and is incorporated into the drilling system 10 downstream from the rotating control device 12 and upstream from the gas separator 30. The manifold 20 has chokes 22, a mass flow meter 24, pressure sensors (not shown), a local controller (not shown) to control operation of the manifold 20, and a hydraulic power unit (not shown) and/or electric motor to actuate the chokes 22. The control system 100 is communicatively coupled to the manifold 20 and has a control panel with a user interface and processing capabilities to monitor and control the manifold 20.

The system 10 uses the rotating control device 12 to keep the well closed to atmospheric conditions. Fluid leaving the wellbore 16 flows through the automated choke manifold 20, which measures return flow and density using the flow meter 24 installed in line with the chokes 22. Software components of the control system 100 then compare the flow rate in and out of the wellbore 16, the injection pressure (or standpipe pressure), the surface backpressure (measured upstream from the drilling chokes 22), the position of the chokes 22, and the mud density. Comparing these variables, the control system 100 identifies minute downhole influxes and losses on a real-time basis to manage the annulus pressure during drilling. All of the monitored information can be displayed for the operator on the control panel of the control system 100.

In the controlled pressure drilling, the control system 100 introduces pressure and flow changes to this incompressible circuit of fluid at the surface to change the annular pressure profile in the wellbore 16. In particular, using the choke manifold 20 to apply surface backpressure within the closed loop, the control system 100 can produce a reciprocal change in bottomhole pressure. In this way, the control system 100 uses real-time flow and pressure data and manipulates the annular backpressure to manage wellbore influxes and losses.

In a managed pressure drilling (MPD) system, the control system 100 uses internal algorithms to identify what is occurring downhole and reacts automatically. As can be seen, the control system 100 monitors for any deviations in values during drilling operations, and alerts the operators of any problems that might be caused by a fluid influx into the wellbore 16 from the formation F or a loss of drilling mud into the formation F. In addition, the control system 100 can automatically detect, control, and circulate out such influxes by operating the chokes 22 on the choke manifold 20.

For example, a possible fluid influx or "kick" can be noted when the "flow out" value (measured from the flow meter 24) deviates from the "flow in" value (measured from the stroke counters of the mud pumps 50). As is known, a "kick" is the entry of formation fluid into the wellbore 16 during drilling operations. The kick occurs because the pressure exerted by the column of drilling fluid is not great enough to overcome the pressure exerted by the fluids in the formation being drilled.

The kick or influx is detected when the well's flow-out is significantly greater than the flow-in for a specified period of time. Additionally, the standpipe pressure (SPP) should not increase beyond a defined maximum allowable SPP increase, and the density-out of fluid out of the well does not drop more than a surface gas density threshold. When an influx or kick is detected, an alert notifies the operator to apply the brake until it is confirmed safe to drill. Meanwhile, no change in the rate of the mud pumps 50 is needed at this stage.

In the control system 100, the kick control can be an automated function that combines kick detection and control, and the control system 100 can base its kick control algorithm on the modified drillers' method to manage kicks. In a form of auto kick control, for example, the control system 100 automatically closes the chokes 22 to increase surface backpressure in the wellbore annulus 16 until mass balance is established and the influx stops.

The control system 100 adds a predefined amount of pressure as a buffer and circulates the influx out of the well by controlling the stand pipe pressure. The stand pipe pressure will be maintained constant by automatically adjusting the surface backpressure, thereby increasing the downhole circulating pressure and avoiding a secondary influx. A conceptualized trip tank is monitored for surface fluid volume changes because conventional pit gain measurements are usually not very precise. This can all be monitored and displayed on the control system 100 to offer additional control of these steps.

Once the flow-out and flow-in difference is brought under control, the control system 100 will maintain this equilibrium for a specified time before switching to the next mode. In a successful operation, the kick detection and control cycle can be expected to be managed in roughly two minutes. The kick fluid will be moving up in the annulus with full pump speed using a small decreased relative flow rate of about −0.1 gallons per minute to safely bring the formation pressure to balance.

On the other hand, a possible fluid loss can be noted when the "flow in" value (measured from the stroke counters of the pumps 50) is greater than the "flow out" value (measured by the flow meter 24). As is known, fluid loss is the loss of whole drilling fluid, slurry, or treatment fluid containing solid particles into the formation matrix. The resulting buildup of solid material or filter cake may be undesirable, as may be any penetration of filtrate through the formation, in addition to the sudden loss of hydrostatic pressure due to rapid loss of fluid.

Similar steps as those above, but suited for fluid loss, can then be implemented by the control system 100 to manage the pressure and flow during drilling in this situation. Killing the well is attempting to stop the well from flowing or having the ability to flow into the wellbore 16. Kill procedures typically involve circulating reservoir fluids out of the wellbore or pumping higher density mud into the wellbore 16, or both.

In the closed-loop drilling system 10, any observed loss can only be attributed to the formation, whereas in normal drilling a mud loss is detected at the pits and could be attributed to several things, including loss from solids control equipment, cuttings with mud, evaporation, downhole losses, or surface leaks.

The operator can initiate pumping the new mud with the recommended or selected kill mud weight. As the kill mud starts to go down the wellbore 16, the chokes 22 are opened up gradually approaching a snap position as the kill mud circulates back up to the surface. Once the kill mud turns the bit 18, the control system 100 again switches back to the standpipe pressure (SPP) control until the kill mud circulates all the way back up to the surface.

In addition to the choke manifold 20, the drilling system 10 can include a continuous flow system (not shown), a gas evaluation device 26, multi-phase flow meter 28, and other components incorporated into the components of the system 10. The continuous flow system allows flow to be maintained while drillpipe connections are being made, and the drilling system 10 may or may not include such components. For its part, the gas evaluation device 26 can be used for evaluating fluids in the drilling mud, such as evaluating hydrocarbons (e.g., C1 to C10 or higher), non-hydrocarbon gases, carbon dioxide, nitrogen, aromatic hydrocarbons (e.g., benzene, toluene, ethyl benzene and xylene), or other gases or fluids of interest in drilling fluid. Accordingly, the device 26 can include a gas extraction device that uses a semi-permeable membrane to extract gas from the drilling mud for analysis.

The multi-phase flow meter 28 can be installed in the flow line to assist in determining the make-up of the fluid. As will be appreciated, the multi-phase flow meter 28 can help model the flow in the drilling mud and provide quantitative results to refine the calculation of the gas concentration in the drilling mud.

As noted above, controlling pressure during drilling essentially requires moving the chokes 22 with a control to achieve a necessary amount of pressure or flow according to the purposes of the well control operations governed by the control system 100. Therefore, an element of this automation is a control-loop feedback mechanism that consists of a control tailored to characterize the MPD equipment (e.g., choke actuators) and is capable of adapting to changing dynamics, such as mud systems, well compressibility, drilling windows, and surface equipment limitations.

In the tight pore pressure and fracture gradient windows that can be found in wellbores 16, successful drilling often involves maintaining a predefined pressure at a specific depth in the well. This involves eliminating and minimizing pressure spikes and oscillations that might exceed the drilling window parameters and create a kick-loss event. Drilling under these circumstances commonly requires pressure regimes that are less than 100 psi between the respective gradients.

During operations, the choke's response (i.e., movement, speed, and accuracy) are determined by the choke's controls. Typically, a proportional-integral-derivative (PID) control has been used to control the chokes 22 to change pressure or flow in the system 10. Such PID control is a common component of industrial automation, aviation, and other processes. In controlled drilling operations, the PID control provides the feedback used to adjust and stabilize wellbore pressure and flow. In particular, a proportion-integral control is typically used in controlled pressure drilling.

Figure 2A:
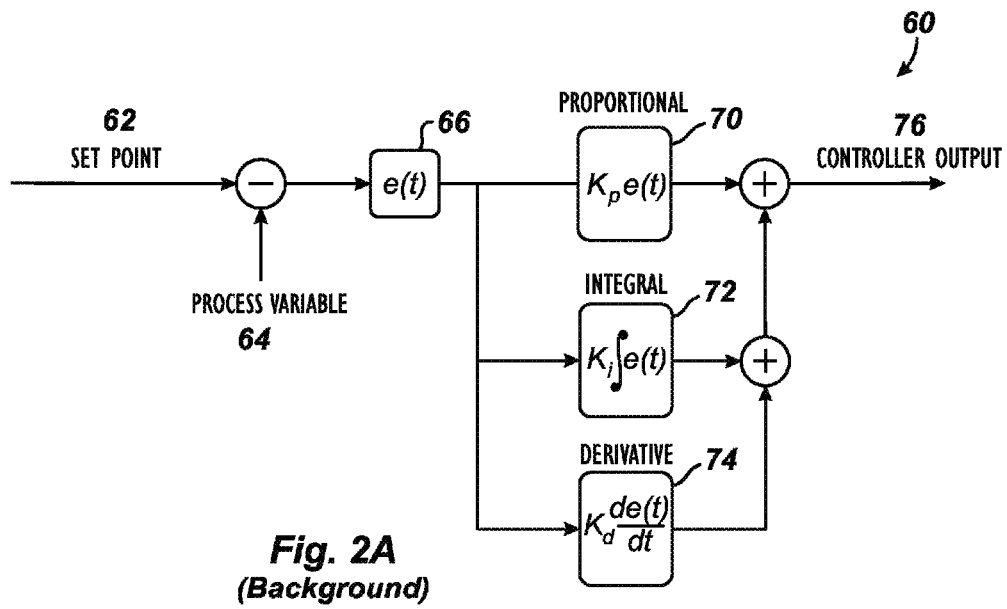
FIG. 2A illustrates, as background, a typical proportional-integral-derivative (PID) control that can be used in controlled pressure drilling.

As background, for example, FIG. 2A illustrates a typical proportional-integral-derivative (PID) control 60 that can be used in controlled pressure drilling to control a choke (e.g., 22: FIG. 1). In this control 60, a process variable 64 (e.g., current surface backpressure in the drilling system 10, current choke position, etc.) is compared to a configured set point 62 to calculate an error 66. That error 66 can then be operated on by one or more of: a proportional gain ($K_p$) times the magnitude of the error (e(t)) (70), an integral gain ($K_i$) times the integral of the error (e(t)) (72), and a derivative gain ($K_d$) times the derivative of the error (e(t)) (74). The one or more of these are then summed together to provide a control output 76 (e.g., a new pressure, a new choke position, etc.).

In the drilling system 10 of FIG. 1, for example, the PID control 60 of FIG. 2A stabilizes wellbore pressure fluctuations by managing pressure quickly in small increments. These increments can be as small as ±1 psi when circulating homogeneous fluid or during pipe connections with the aid of auxiliary flow, or as much as ±10 psi when circulating gas or large cuttings. In other cases such as when tripping in or out with as much as 500-psi of surface pressure, observed increments or decrements in pressure can range from 5 to 20-psi.

The PID control 60 is helpful when responding to variations in well pressure or in manipulating the bottomhole pressure when pumping stops during a connection. With the automated drilling system 10, the adjustments can be more instantaneous and can be made in a more orchestrated manner than purely manual adjustments.

Automation also provides the annular pressure management in the system 10 that maintains a predefined pressure in the wellbore 16. With the annular pressure control, if the flow coming out of the well 16 decreases rapidly, the control system 100 automatically adjusts surface backpressure to hold the operator-defined set points. This is also applicable to overcoming pump problems when drilling ahead such as in the case of pop-off occurrences and stalled motors.

While the automated control system 100 drives itself, the controlled pressure operations nevertheless require on site monitoring and input. Oversight is critical because of uncertainties that come with drilling a well, which is not a steady-state process. While drilling ahead, for example, the bit 18 can encounter unexpected fractures or abnormally pressured zones. How much a zone will produce before it depletes or how much fluid a fracture might take often is unknown. While the control system 100 may have various set points defined based on what is anticipated, these may not be the right set points for the actual conditions. Likewise, the controls for the chokes 22 in the manifold 20 may not adjust well to the set points under certain circumstances.

For instance, the conventional PID control 60 for FIG. 2A does not work well when the choke 22 is near its fully closed states when small movements of the choke's components produces larger changes in pressure or flow. With the current PID control 60 of FIG. 2A, for example, operators must manipulate the gains of the PID control 60 manually when the choke 22 is near these fully closed states. Typical choke control software has inputs that allow operators to make such manual adjustments to the PID gains, but operators have to monitor the pressure or flow carefully and manually adjust the gains based on what conditions and response they are seeing and what their experience indicates.

Figure 2B:
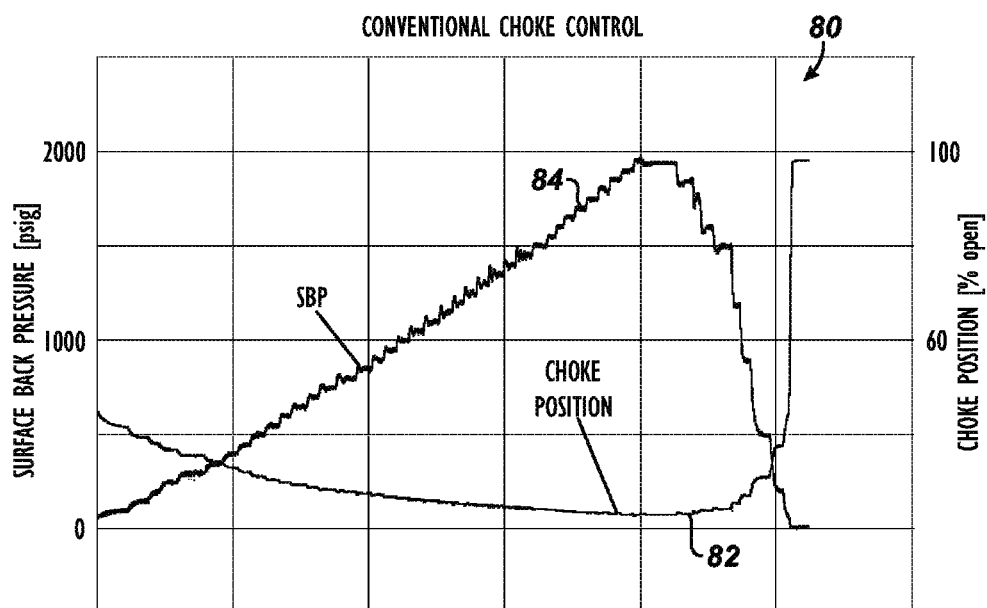
FIG. 2B graphs, as background, conventional PID control of a choke showing the surface backpressure change relative to the controlled choke position.

FIG. 2B graphs, as background, the conventional form of PID control of a choke (e.g., 22: FIG. 1) showing the surface backpressure changes relative to the controlled choke position in the drilling system (10). This graph shows how the current PID control (60: FIG. 2A), which is manually tuned by operators, functions to control surface backpressure. The choke position 82 is adjusted over time with the PID control 60 to affect the surface backpressure 84, which is graphed for comparative purposes. As it appears, the choke position 82 is adjusted closed as the surface backpressure continues to rise and reaches a peak level of almost 2000-psig. A sudden drop in the surface backpressure 84 then follows, and the choke position 82 is rapidly adjusted open.

Per conventional practices, tuning for the various gains 70, 72, and 74 in FIG. 2A of the PID control 60 is handled manually by operators of the drilling system 10 to achieve a desired system response. Even for a typical automated control system 100, a person has to make that assessment and change the set points. The system is automated per its reaction, but it is not drilling the well on its own. The process requires expert support for a guided automation.

As will be appreciated, all this handling and tuning of the controls depends on how the operator sets up the control system 100. Initially, the interface of the control system 100 requires that certain parameters be established, such as set points, pressure and flow differential dead-bands, and time durations desired before the system reacts. Setting these limits incorrectly can pose problems. For example, specifying a 1-sec trend time and small differentials in flow and pressure would trigger frequent automatic responses acting upon normal fluctuations in mass balance such as those caused by heaving or pipe movement. This would make the identification of events less reliable.

Even with automated controls as discussed above, operators may need to adjust or tune the choke's response to account for various changed conditions. This can be difficult and prone to human error. According to the techniques disclosed herein, however, data related to the flow coefficient of the choke 22 is used as a tuning factor within a choke control. During operations, the disclosed control system 100 can reduce or eliminate the tuning required by existing forms of PID control 60 used in the choke manifold 20. As already indicated above, the current forms of tuning controls in a system are challenging for operators to properly do in real time because the conditions of flow rate and back pressure required are always changing in real time.

As is generally known, flow coefficient (Cv) is a dimensionless variable that relates flow rate of a choke valve (e.g., 22) to the differential pressure produced. The flow coefficient Cv can be provided as an index value equivalent to the gallons per minute of water at standard temperature (60° F.=16° C.) that will flow through a valve or fitting at a pressure differential across the valve of 1-psi.

For an incompressible type of fluid, a valve's flow coefficient (Cv) can be calculated using the equation:

$$Cv = Q/\sqrt{DP/SG}$$

where:
Q—Flow rate,
DP—Differential pressure at the valve, and
SG—Specific gravity of the fluid.

The equation for a compressible type of fluid includes considerations of various factors, such as absolute upstream temperature, gas specific gravity, upstream absolute static pressure, expansion factor, etc. Particular equations are provided by The International Society of Automation's control valve standards, such as ISA-75.

In the context of the drilling system 10 of the present disclosure, the flow coefficient (Cv) of interest is not strictly calculated. Instead, the flow coefficient (Cv) depends on the fluids involved and choke valve's design. To that end, the flow coefficient character of the present disclosure relating the flow coefficient (Cv) to choke positions is configured for the particular choke 22 used in the drilling system 10, type of fluid, and other conditions.

Figure 3:
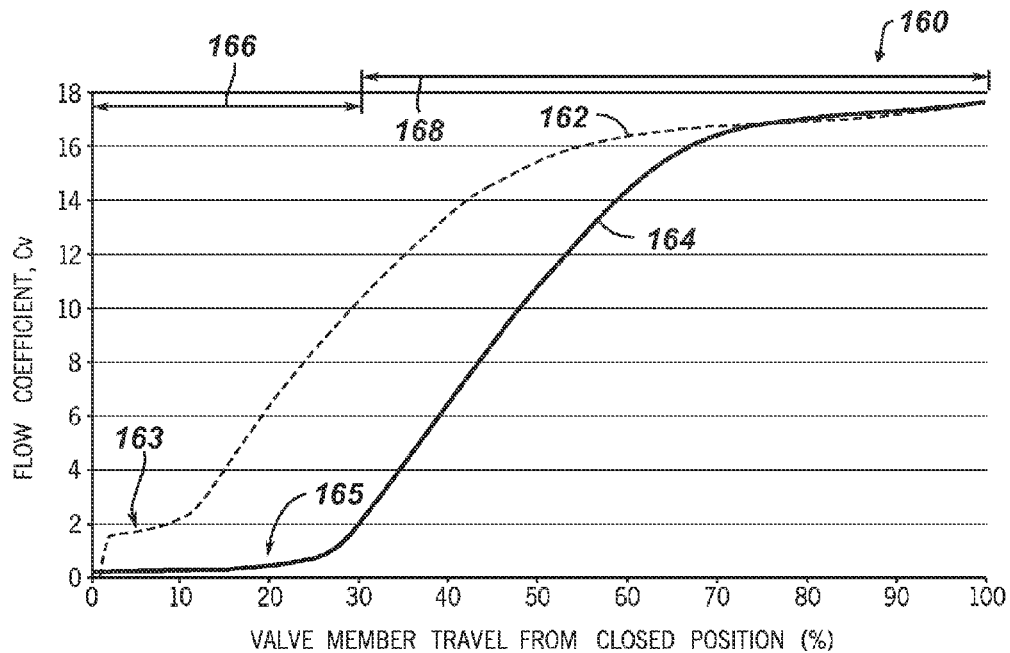
FIG. 3 graphs, as background, the flow coefficient character relative to the choke valve positions for two types of chokes.

As background, for example, FIG. 3 graphs curves 162, 164 for the flow coefficient character (Cv versus valve-member position) of two types of choke valves—namely, a first curve 162 for a conventional choke valve and a second curve 164 for a modified choke valve with flow-impeding recesses, such as disclosed in US 2011/0094607. The ordinate shows the percentage of the valve-members stroke from the closed position, and the abscissa shows the flow coefficient exhibited by the choke valves. When increasing from a low flow range 166 to a higher flow range 168, the conventional choke valve's curve 162 rapidly steps 163 to a higher flow coefficient. In contrast, the modified choke valve's curve 164 with flow-impeding recesses gradually increases with slope 165 for the flow coefficient during the transition from the low flow range 166 to the higher range 168. As the graph of FIG. 3 helps elucidate, knowing the flow coefficient character of the particular choke 22 in the drilling system 10 allows the control system 100 to tune the choke's response based at least on the choke's position, although further consideration can be given based on type of fluid and other considerations.

Figure 4:
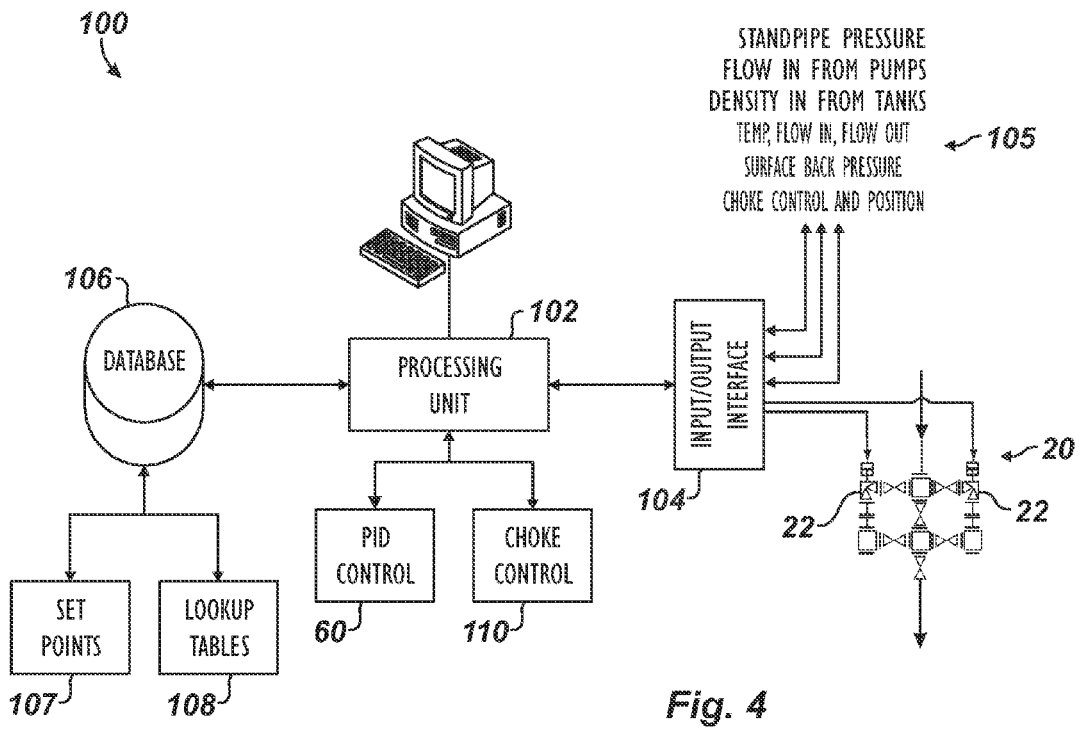
FIG. 4 illustrates a schematic of the disclosed control system.

In particular, the control system 100 of the present disclosure, which performs the tuning, is schematically shown as a computerized control in FIG. 4. The control system 100 includes a processing unit 102, which can be part of a computer system, a server, a programmable control device, a programmable logic controller, etc. Using input/output interfaces 104, the processing unit 102 can communicate with the choke(s) 22 and other system components to obtain and send communication, sensor, actuator, and control signals 105 for the various system components as the case may be. In terms of the current controls discussed, the signals can include, but are not limited to, the choke position signals, the system pressure signals, system flow signals, temperature signals, fluid density signals, etc.

The processing unit 102 also communicatively couples to a database or storage 106 having set points 107, lookup tables 108, and other stored information. The lookup tables 108 characterize the specifications of the choke 22 and the flow coefficient character (e.g., flow coefficient versus choke position) of the choke 22. This information can be defined by the choke's manufacture and through testing of the choke 22. Although lookup tables 108 can be used, it will be appreciated that any other form of curve, function, data set, etc. can be used to store the flow coefficient character. Additionally, multiple lookup tables 108 or the like can be stored and can be characterized based on different chokes, different drilling fluids, different operating condition, and other scenarios and arrangements.

Finally, the processing unit 102 can operate a choke control 110 according to the present disclosure for monitoring, tuning, and controlling the choke(s) 22. For example, the processing unit 102 can transmits signals to one or more of the chokes 22 of the drilling system using any suitable communication. In general, the signals are indicative of a choke position or position adjustment to be applied to the chokes 22. Typically, the chokes 22 are controlled by hydraulic power so that electronic signals transmitted by the processing unit 102 may operate solenoids, valves, or the like of a hydraulic power unit for operating the chokes 22. As shown here and in FIG. 1, two chokes 22 are typically used in the closed-loop drilling system 10. The same choke control can apply adjustments to both chokes or separate choke controls can be used for each choke 22. In fact, the two chokes 22 may have differences that can be accounted for in the two choke controls used.

As will be discussed in more detail below, the control system 100 uses the high-speed choke control 110 tuned in real-time using interpolated flow coefficient Cv data (108) based on choke position signals (105). A relative choke position set point (107) is calculated instead of an absolute position set point (0% to 100%) in real-time and applied to a desired position for the choke(s) 22 to achieve the purposes of the controlled pressure drilling. In other words, the choke control 110 uses the choke's flow coefficient (Cv) for tuning the control and determining the required adjustment to the current choke position, instead of determining an absolute choke position as conventionally done. This tuning provides the required control response as conditions change and the choke 22 operates in its upper or lower ranges of the Cv curve, which can improve performance of the choke manifold 20.

FIG. 5 illustrates a choke control 110 according to the present disclosure. The choke control 110 controls pressure or flow in the controlled pressure drilling applications to improve performance and reduce operator-tuning requirements while controlling pressure or flow. It is recognized that a given choke flow coefficient (Cv) curve has a non-linear relationship to the choke's position, and the changes in response are significant with changes in flow rate and density. As already explained, the conventional choke control algorithms require operators to manually tune the PID control parameters as flow rates change and when pressure needs to be increased or decreased. This tuning must be done by the operators as conditions occur and is cumbersome and prone to error.

By contrast, the choke control 110 of the present disclosure eliminates or reduces the need for this manual tuning by instead auto-tuning a proportional control of the choke 22 based on a flow coefficient Cv for the choke's current position. The control 110 calculates the position of the choke 22 (e.g., in terms of percent open 0-100%) by using a proportional control algorithm. This calculation is performed using the control system 100 at high speeds to continuously update the choke position. Each calculation involves calculating an error (Block 116), which is the difference between a set-point 112 and a measured variable 114 of a parameter in the closed-loop drilling system 10.

In one implementation, pressure is used for the parameter in the error so that the error is calculated between the measured pressure 114 and the set point pressure 112. Operating the choke control 110 based on pressure is useful during typical controlled pressure drilling conditions as the drilling system 10 controls the surface back pressure during operations.

In another implementation, flow is used for the parameter in the error so that the error is calculated between the measured flow 114 and the set point flow 112. Operating the choke control 110 based on flow is useful when the drilling system 10 has detected a kick (influx) and seeks to circulate out the kick. In addition to flow and pressure, the choke control 110 can use any other parameter affected by the choke 22 and useful in controlling the controlled pressure drilling operations. For the purposes of discussion, although reference to pressure is made in the description of the disclosed choke control 110, comparable application can be made to flow or any other suited parameter.

After calculating the error, the absolute value of the error signal (Block 116) is then multiplied by a gain factor (Block 118). The gain factor is dynamically calculated based on the magnitude of the error from Block 116. As the error decreases, for example, the gain in Block 118 is increased to provide the control 110 with greater accuracy when doing small adjustments. As will be discussed below, an interpolated error factor can be applied to the gain to account for steady state errors when the errors involved in the calculations are below a certain level.

The gain-adjusted error from Block 118 is then multiplied by a flow coefficient Cv correction factor based on the choke's flow coefficient Cv character stored in the control 110 (Block 122). In this step 122, a spline interpolation can be used based on the current choke position 120 relative to the choke's flow coefficient Cv to determine the correction factor to apply. This factor is applied to the current error (Block 118) previously calculated to determine a choke position adjustment (Block 124). In turn, the position adjustment (Block 124) is added to the current position 120 of the choke (Block 126), which gives a new choke positon 128 relative to the previous position. Limits are applied to the new choke position 128 to maintain range integrity (0-100%).

This entire process of the control 110 then repeats itself in which the new choke position 128 becomes the current position so a new adjustment is calculated as needed. As operations continue, the process of the control 110 can repeat every 2-ms or so, which provides rapid control of the choke's response.

In Block 116 of the choke control 110, the error is calculated as the difference between an actual "measured" pressure or flow 114 and a pressure or flow set point 112 provided by other algorithms of the control system 100 (i.e., error (e)=actual pressure−pressure set point or error (e)=actual flow−flow set point).

As noted above, the choke position adjustment (Block 124) in the choke control 110 is calculated and compensated for based on the flow coefficient (Cv). The choke adjustment is a product of the error (Block 116), flow coefficient (Cv) (Block 122), a gain tuning factor (118), and an error interpolation factor ($e_i$). From this, an updated choke position 128 (i.e., new position set point) is calculated using the actual choke position 120 plus or minus the calculated adjustment from Block 124.

For the control based on pressure, the flowing equations describes the choke control's calculation of the new relative choke position:

$$P_{out}=(K_{pcv}*e(t))+P_C$$

where:
SP is the Pressure Set Point,
PV is the Measured Pressure,
e(t) is the Instantaneous Error at time (t) (SP−PV),
$P_C$ is the Current Choke Position,
$P_{out}$ is the New Choke position relative to current Position, and
$K_{pcv}$ is the proportional gain corrected by the flow coefficient (Cv).

A comparable equation would be used for control based on flow, which would use a measured flow value, a flow set point value, and the corresponding error. Likewise, other parameters for the control can be similarly equated.

In the above equation, the Cv correction factor ($K_{pcv}$) can be characterized as follows:

$$K_{pcv}=Cv*g*e_i$$

The gain (g) can be a set, preconfigured value to proportionally scale the control. The flow coefficient Cv in the correction factor ($K_{pcv}$) is based on manufacturer specifications of the particular choke and is interpolated using the current choke position 120. In particular, the flow coefficient Cv is obtained using manufacturer specifications of the choke 22, and the needed values can be interpolated based on the current choke position 120. For example, a lookup table 108 can be created and stored within the control system 100 relating various choke positions to values of the flow coefficient Cv. Because the flow coefficient Cv is non-linear and depends on the choke's position, the flow coefficient Cv adjusts the overall gain (g) to account for the current choke's position and operational characteristics.

The interpolated error factor ($e_i$), as noted above, is used to eliminate steady state error that can occur when the magnitude of the error is low, which would mean that small changes in the error would be subsumed in the magnitude of the other components of the Cv correction factor ($K_{pcv}$). In one implementation, the interpolated error factor ($e_i$) is a linear interpolation between a gain multiplier ranging from 3 to 1 relative to an error level ranging from 0 to 30-psi. If the error is greater than 30-psi, then the gain multiplier remains 1 so that the overall gain of the control 110 is not changed. Therefore, the overall gain (g) multiplied by the interpolated error factor ($e_i$) from 1 to 3 will be increased for pressure errors falling from 30-psi to 0-psi.

At each iteration of the choke control 110, a new choke adjustment (Block 124) is obtained by interpolating the flow coefficient Cv of the current position in the look up table 108 (Block 122) stored in the control system 100 and applying the coefficient Cv to the error (Block 116) and proportional gain (Block 118). This new choke adjustment (Block 124)

accounts for the position of the choke 22 and the value of the flow coefficient Cv for that position. The disclosed choke control 110 using the new choke adjustment (Block 124) from the Cv correction factor ($K_{pcv}$) can eliminate or reduce the need for operators to manually tune the control of the choke 22, which is required with the conventional PID control.

Although the discussion of the choke control 110 above focused on using the flow coefficient Cv as a tuning factor for proportional control of the choke 22, the flow coefficient Cv can be used instead with (or additionally) with an integral control and/or a derivative control. In this sense, the gain for integral control and/or derivative control can be tuned with the flow coefficient Cv in a manner similar to what has been described above for tuning of the proportional control's gain.

FIG. 6A graphs pressure control 130 achieved with the disclosed choke control 110. Under this new control scheme, a pressure target is set, and the control 110 can reach that pressure target rapidly and can then rest at that pressure target for a time, until further adjustment is needed. This graph shows the amplitude of the pressure being controlled by the disclosed choke control at a number of different pressure set points. As the graph shows, the pressure response resulting from the disclosed control can be rapid and smooth by self-tuning to the changes.

Figure 6B:
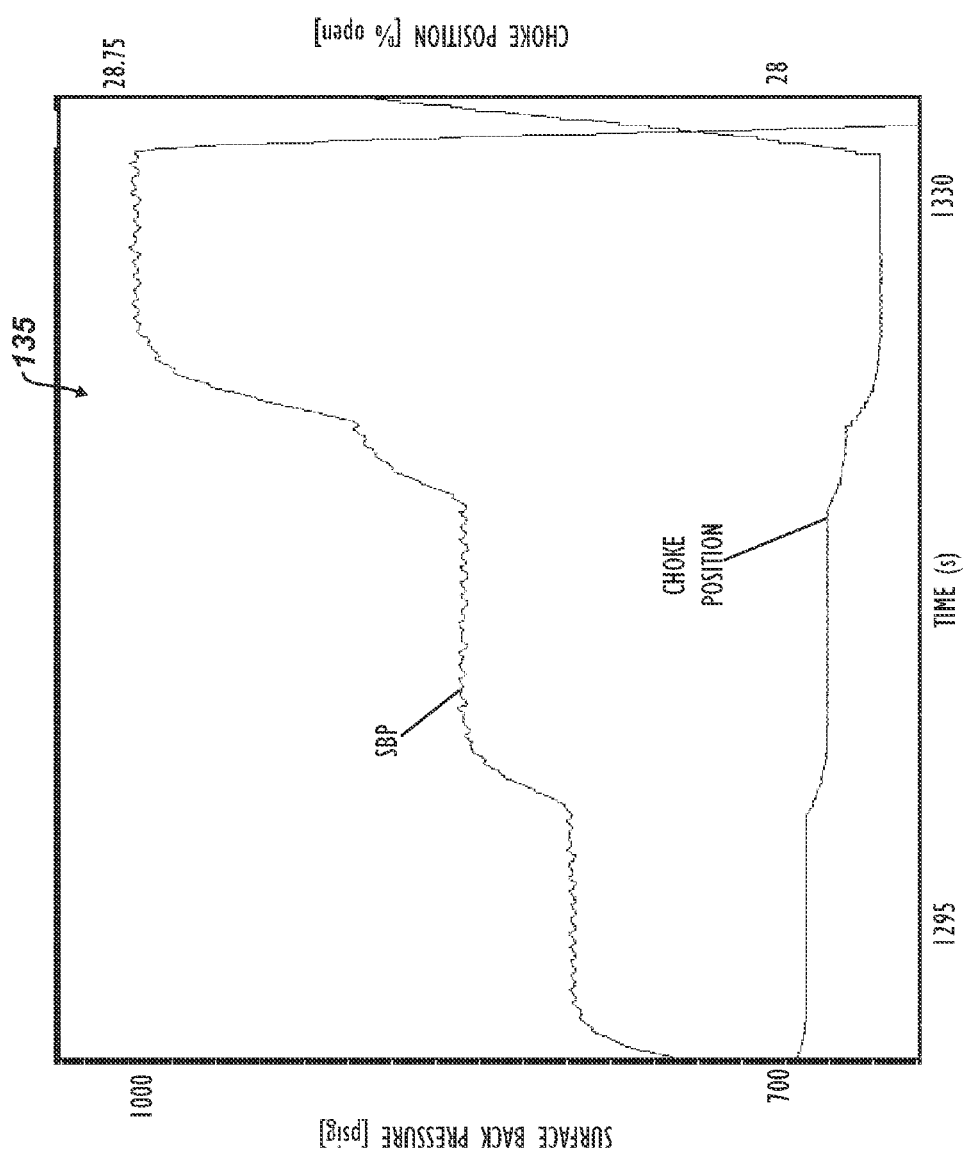
FIG. 6B graphs the disclosed choke control showing the surface backpressure's change relative to the controlled choke position.

Similarly, FIG. 6B graphs the disclosed choke control 135 showing the surface backpressure change relative to the controlled choke position. Again, transitions to set point pressures are rapid and smooth.

Figure 7A:
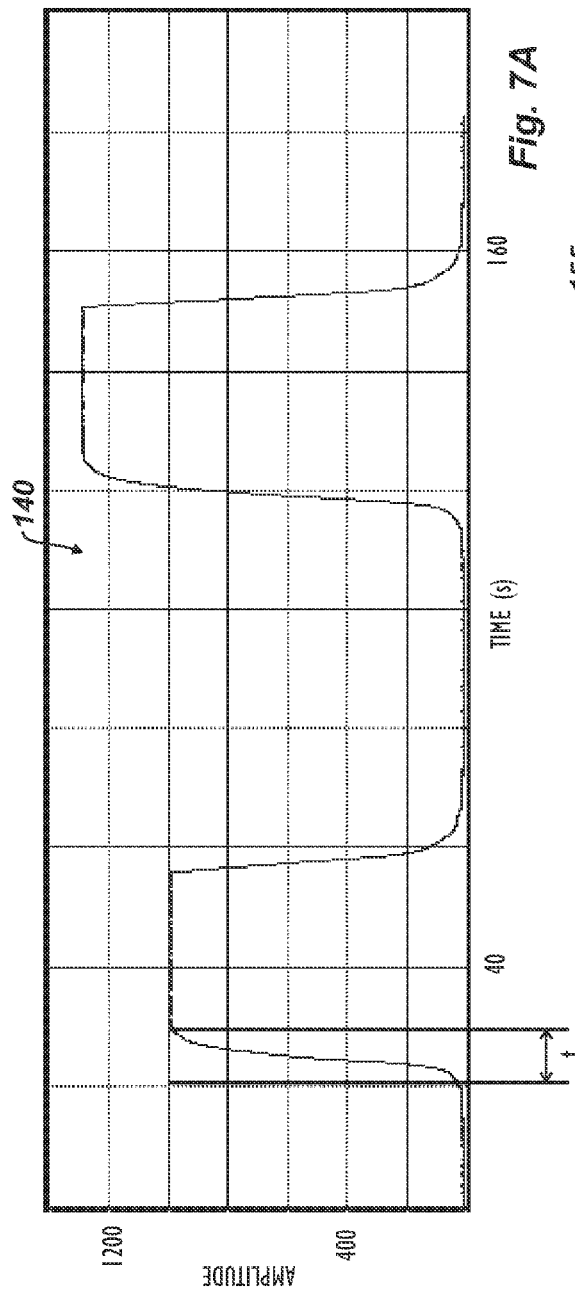
FIG. 7A graphs pressure control tests using the disclosed choke control.

FIG. 7A graphs pressure control tests using the disclosed control 110 based on the Cv correction factor. The response 140 increases smoothly and rapidly within about 8-sec. The response also decreases smoothly and rapidly. In this example, similar responses 140 are seen for two set points of 1000-psi and 1300-psi.

Figure 7B:
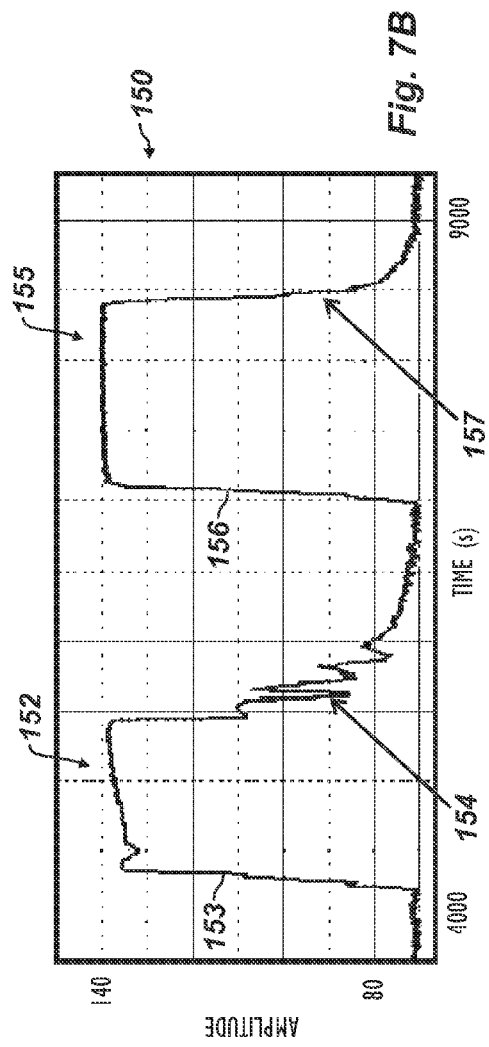
FIG. 7B graphs test results between a conventional PID control's response versus the disclosed control's response.

For comparative purposes, a test was conducted using a fixture that provided flow of fluid with an actuator to control a choke valve to adjust and maintain pressure. The test was conducted using a standard PID control (FIG. 2A) and the disclosed choke control 110 (FIG. 5). The pressure was changed from 70-psi to 140-psi and then from 140-psi back to—70 psi and the resulting pressure in the system was recorded. The graph 150 in FIG. 7B illustrates the results from the test.

The left response curve 152 shows the PID response in terms of pressure amplitude versus time. This response 152 shows the pressure adjustment using a standard PID control. The PID response 152 shows that the standard PID control for the pressure increase 153 does not provide similar results for pressure decrease 154. The results show that the tuning used at 70-psi does not work the same as when used at 140-psi.

By contrast, the right response curve 155 shows pressure response using the adjustments by disclosed choke control (110). This response 155 shows that the tuning for both pressure increase 156 and decrease 157 provide a smooth response. The results show that the tuning used at 140-psi works at 70-psi as well.

The PID control's increase 153 is slower than the increase 156 achieved with the disclosed choke control. In fact, the PID control's response 152 is slow to reach the set point of 140-psi because the PID control inherently attempts to not overshoot the set point so that the increase 153 reaches near the set point, edges back, and then slowly ramps to the set point. By contrast, the disclosed choke control's increase 156 more rapidly reaches the set point of 140-psi, which the control then sustains.

The difference in the decreases 154 and 157 is even more pronounced between the PID control's response 152 and the disclosed control's response 155. The pressure decrease 154 of the PID control's response 152 oscillates and extends out in time. By contrast, the decrease 157 of the disclosed control's response 157 falls more smoothly and rapidly.

As disclosed herein, the disclosed choke control 110 can be used in a closed-loop drilling system 10 to perform controlled pressure drilling. The response of the disclosed choke control 110 can be particularly beneficial in the drilling system 10 when handling kicks (influxes), handling losses, making drilling connections, and other circumstances where more pronounced choke adjustments are needed. For example, during a detected kick in the drilling system 10, the disclosed choke control 110 can use the error between measured flow and flow set point to adjust the choke position (e.g., close the choke) as the drilling system 10 attempts to circulate out the kick from the closed-loop system 10 and maintain the surface back pressure within the desired drilling window.

In a similar manner, for example, during a detected loss in the drilling system 10, the disclosed choke control 110 can use the error between measure pressure and pressure set point to adjust the choke position (e.g., open the chokes) to handle the loss and maintain the surface back pressure within the desired drilling window.

Additionally, the disclosed choke control 110 can be beneficial during connections made during drilling. In this context, the mud pumps 60 are brought down while a drillpipe connection is being made at the rig. Friction down the wellbore 16 decreases, and the bottom hole pressure decreases. To increase the surface back pressure, the chokes 22 close toward the low end of their range. The disclosed choke control 110 is able to handle the adjustments to the choke positions, automatically being tuned as disclosed herein based on the flow coefficient of the choke at the operating conditions and based on the error in pressure.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure. To that end, a programmable storage device having program instructions stored thereon for causing a programmable control device can perform the teachings of the present disclosure.

The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method, implemented by a computerized control, of drilling a wellbore with a drilling system having a choke, the method comprising:
    obtaining, with the computerized control, a measured value of a parameter in the drilling system;
    controlling, with the computerized control, the parameter in the drilling system using the choke;
    obtaining, with the computerized control, indications of an error between a set point of the parameter and the measured value of the parameter in the drilling system, a flow coefficient character of the choke, and a current position of the choke;
    determining, with the computerized control, a position adjustment for the choke based on the indications of the error, the flow coefficient character, and the current position comprising scaling a value of the error by a gain corrected for the flow coefficient character of the choke and applying the scaled value of the error to the current position; and
    adjusting, with the computerized control, the parameter in the drilling system using the choke by applying the position adjustment to the choke.

2. The method of claim 1, wherein obtaining, with the computerized control, the measured value of the parameter in the drilling system comprises receiving, at the computerized control, the measured value from at least one measurement device in the drilling system.

3. The method claim 1, wherein controlling the parameter in the drilling system using the choke comprises at least one of:
    controlling a surface back pressure in the wellbore using the choke;
    controlling a flow rate of drilling fluid out of the wellbore using the choke;
    controlling a pressure using the choke during a drillpipe connection while drilling with the drilling system;
    controlling a pressure using the choke during a loss detected while drilling with the drilling system; and
    controlling a flow using the choke during a kick detected while drilling with the drilling system.

4. The method of claim 1, wherein scaling the value of the error further comprises applying an error-based gain factor to the value of the error.

5. The method of claim 4, wherein applying the error-based gain factor to the value of the error comprises determining the error-based gain factor by a magnitude of the value of the error.

6. The method of claim 5, wherein applying the error-based gain factor to the value of the error comprises multiplying the value of the error by the error-based gain factor inversely proportional to the magnitude of the value of the error.

7. The method of claim 1, wherein determining the position adjustment for the choke comprises determining a new relative position for the choke by adding the position adjustment to the indication of the current position of the choke.

8. The method of claim 1, wherein obtaining the indications of the flow coefficient character of the choke and the current position of the choke comprises obtaining a flow coefficient for the choke at the current position from stored information of the flow coefficient character.

9. The method of claim 8, wherein obtaining the flow coefficient for the choke at the current position comprises interpolating the flow coefficient from the stored information.

10. The method of claim 8, wherein determining the position adjustment for the choke based on the indications of the error, the flow coefficient character of the choke, and the current position of the choke comprises scaling the value of the error by the flow coefficient for the choke at the current position.

11. The method of claim 1, wherein obtaining, with the computerized control, the indication of the flow coefficient character of the choke comprises storing the indication of the flow coefficient character of the choke in relation to positions of the choke.

12. The method of claim 1, wherein adjusting, with the computerized control, the parameter in the drilling system using the choke comprises:
    determining a new relative position for the choke by applying the position adjustment for the choke to the current position of the choke; and
    applying the new relative position to the choke.

13. The method of claim 1, wherein determining the position adjustment for the choke based on the indications of the error, the flow coefficient character of the choke, and the current position of the choke comprises scaling the value of the error by a proportional gain as the gain.

14. The method of claim 1, wherein determining the position adjustment for the choke comprises correcting the gain for the choke by the flow coefficient character for the choke at the current position, scaling the value of the error by the corrected gain, and applying the scaled value of the error to the current position.

15. The method of claim 14, wherein correcting the gain for the choke by the flow coefficient character for the choke at the current position comprises scaling the gain by the flow coefficient character of the choke at the current position.

16. The method of claim 15, wherein determining the position adjustment for the choke comprises determining a flow coefficient of the choke from the flow coefficient character based on the current position of the choke, scaling the gain for the choke by the flow coefficient for the choke at the current position, scaling the value of the error by the scaled gain, and adding the scaled value of the error to the current position.

17. The method of claim 1, wherein the error comprises an instantaneous difference between a set point pressure for the set point of the parameter and a measured pressure for the measured value of the parameter at a time.

18. A method, implemented by a computerized control, of drilling a wellbore with a drilling system having a choke, the method comprising:

drilling a wellbore with the drilling system by controlling, with the computerized control, a parameter in the drilling system using the choke;

measuring a value of the parameter using at least one measurement device in the drilling system;

calculating, with the computerized control, an error value between a set point of the parameter and the measured value of the parameter;

interpolating, with the computerized control, a correction factor based on a flow coefficient character of the choke and a current position of the choke;

determining, with the computerized control, a position adjustment for the choke by applying the correction factor to a gain and scaling the error value by the corrected gain;

determining, with the computerized control, a new relative position for the choke by applying the position adjustment for the choke to the current position of the choke; and adjusting, with the computerized control, the parameter in the drilling system using the choke by applying the new relative position to the choke.

19. The method of claim 18, wherein determining the position adjustment for the choke comprises correcting the gain for the choke by the correction factor based on the flow coefficient character of the choke and the current position of the choke, and scaling the value of the error by the corrected gain.

20. The method of claim 19, wherein correcting the gain for the choke by the correction factor based on the flow coefficient character of the choke and the current position of the choke comprises scaling the gain by the flow coefficient character of the choke at the current position.

21. The method of claim 20, wherein determining the position adjustment for the choke comprises determining a flow coefficient of the choke from the flow coefficient character based on the current position of the choke, scaling the gain for the choke by the flow coefficient for the choke at the current position, and scaling the value of the error by the scaled gain; and wherein applying the position adjustment for the choke to the current position of the choke comprises adding the scaled value of the error to the current position.

22. The method of claim 18, wherein scaling the error value further comprises multiplying the error value by an error-based factor inversely proportional to a magnitude of the error value.

23. A computerized control of a choke used in a drilling system for drilling a wellbore, the control comprising:

storage storing a flow coefficient character of the choke in relation to positions of the choke; and a programmable control device operatively coupled to the storage and to the choke, the programmable control device configured to:

obtain a measured value of a parameter in the drilling system;

control the parameter in the drilling system using the choke;

obtain indications of an error between a set point of the parameter and the measured value of the parameter in the drilling system, the flow coefficient character of the choke, and a current position of the choke;

scale a value of the error by a gain corrected for the flow coefficient character of the choke and apply the scaled value of the error to the current position to determine a position adjustment for the choke based on the indications of the error, the flow coefficient character of the choke, and the current position of the choke; and apply the position adjustment to the choke to adjust the parameter in the drilling system; and the position of the choke is adjusted by the programmable control device.

24. The control of claim 23, wherein to determine the position adjustment for the choke, the programmable control device is operable to correct the gain for the choke by the flow coefficient character for the choke at the current position, scale the value of the error by the corrected gain, and apply the scaled value of the error to the current position.

25. The control of claim 24, wherein to correct the gain for the choke by the flow coefficient character for the choke at the current position, the programmable control device is operable to scale the gain by the flow coefficient character of the choke at the current position.

26. The control of claim 25, wherein to determine the position adjustment for the choke, the programmable control device is operable to determine a flow coefficient of the choke from the flow coefficient character based on the current position of the choke, scale the gain for the choke by the flow coefficient for the choke at the current position, scale the value of the error by the scaled gain, and add the scaled value of the error to the current position.

27. The control of claim 23, wherein to scale the value of the error, the programmable control device is further operable to multiply the value of the error by an error-based factor inversely proportional to a magnitude of the error.

* * * * *